(12) United States Patent
Prokhorov et al.

(10) Patent No.: US 9,701,306 B2
(45) Date of Patent: Jul. 11, 2017

(54) RISK MITIGATION FOR AUTONOMOUS VEHICLES RELATIVE TO TURNING OBJECTS

(71) Applicant: Toyota Motor Engineering & Manufacturing North America, Inc., Erlanger, KY (US)

(72) Inventors: Danil V. Prokhorov, Canton, MI (US); Vladimeros Vladimerou, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/581,757

(22) Filed: Dec. 23, 2014

(65) Prior Publication Data

US 2016/0176398 A1    Jun. 23, 2016

(51) Int. Cl.
*B60W 30/09*    (2012.01)

(52) U.S. Cl.
CPC .................... *B60W 30/09* (2013.01)

(58) Field of Classification Search
None
See application file for complete search history.

(56) References Cited

U.S. PATENT DOCUMENTS

| | | |
|---|---|---|
| 8,195,394 B1 | 6/2012 | Zhu et al. |
| 8,712,624 B1 | 4/2014 | Ferguson et al. |
| 2005/0012602 A1* | 1/2005 | Knoop .................. B60Q 9/008 340/435 |
| 2006/0178830 A1* | 8/2006 | Sherony ................ G01S 11/12 701/301 |
| 2008/0162036 A1* | 7/2008 | Breed ................... G08G 1/161 701/408 |
| 2010/0253539 A1* | 10/2010 | Seder ................... G01S 13/723 340/903 |

(Continued)

FOREIGN PATENT DOCUMENTS

| | | |
|---|---|---|
| JP | 2009096361 A | 5/2009 |
| JP | 2009245340 A | 10/2009 |
| JP | 2013041389 A | 2/2013 |

OTHER PUBLICATIONS

"Pedestrian-Avoidance Steer Assist System"; Undated; [retrieved Dec. 22, 2014]; retrieved from the Internet: <http://www.toyota-europe.com/world-of-toyota/safety-technology/toyota-pedestrian-avoidance-steer-assist-system.json>; 5 pages.

*Primary Examiner* — Truc M Do
*Assistant Examiner* — Jess Whittington
(74) *Attorney, Agent, or Firm* — Christopher G. Darrow; Darrow Mustafa PC

(57) ABSTRACT

Arrangements related to the mitigation of risk for an autonomous vehicle relative to turning objects are presented. An object in an external environment of the autonomous vehicle that is turning toward the autonomous vehicle can be detected. It can be determined whether the detected object will impinge upon the autonomous vehicle. Responsive to determining that the detected object will impinge upon the autonomous vehicle, a driving maneuver for the autonomous vehicle can be determined to avoid being impinged upon by the detected object. The autonomous vehicle can be caused to implement the determined driving maneuver.

17 Claims, 6 Drawing Sheets

(56) References Cited

U.S. PATENT DOCUMENTS

| | | | |
|---|---|---|---|
| 2011/0307139 A1* | 12/2011 | Caminiti | G08G 1/163 |
| | | | 701/32.2 |
| 2012/0083960 A1* | 4/2012 | Zhu | G05D 1/0214 |
| | | | 701/23 |
| 2012/0130582 A1* | 5/2012 | Hukkeri | B60W 10/04 |
| | | | 701/25 |
| 2012/0323474 A1* | 12/2012 | Breed | B60W 30/04 |
| | | | 701/117 |
| 2012/0330542 A1* | 12/2012 | Hafner | G08G 1/163 |
| | | | 701/301 |
| 2014/0067206 A1* | 3/2014 | Pflug | B60W 10/04 |
| | | | 701/41 |

* cited by examiner

RISK MITIGATION FOR AUTONOMOUS VEHICLES RELATIVE TO TURNING OBJECTS

FIELD

The subject matter described herein relates in general to vehicles having an autonomous operational mode and, more particularly, to the operation of such vehicles relative to turning objects.

BACKGROUND

Some vehicles include sensors that are configured to detect information about the surrounding environment. Computing systems are configured to process the detected information to determine how to navigate and/or maneuver the vehicle through the surrounding environment. Some vehicles include driver assist systems that can help to avoid collisions with objects detected in the surrounding environment. Depending on the circumstances, the driver assist system may activate only the brakes, or it may also steer the vehicle away from the object if sufficient space is available.

SUMMARY

In one respect, the present disclosure is directed to a method of mitigating risk for an autonomous vehicle relative to turning objects. The method includes detecting an object in an external environment that is turning toward the autonomous vehicle. The method can also include determining whether the detected object will impinge upon the autonomous vehicle. Responsive to determining that the detected object will impinge upon the autonomous vehicle, the method can further include determining a driving maneuver for the autonomous vehicle to avoid being impinged upon by the detected object. The method can include causing the autonomous vehicle to implement the determined driving maneuver.

In another respect, the present disclosure is directed to a risk mitigation system for an autonomous vehicle relative to turning objects. The system includes a sensor system and a processor operatively connected to the sensor system. The sensor system can be configured to detect an object in an external environment that is turning toward the autonomous vehicle. The processor can be programmed to initiate executable operations. The executable operations can include determining whether the detected object will impinge upon the autonomous vehicle. The executable operations can also include, responsive to determining that the detected object will impinge upon the autonomous vehicle, determining a driving maneuver for the autonomous vehicle to avoid being impinged upon by the detected object. The executable operations can include causing the autonomous vehicle to implement the determined driving maneuver.

In yet another respect, the present disclosure is directed to a computer program product for mitigating risk for an autonomous vehicle relative to turning objects. The computer program product includes a computer readable storage medium having program code embodied therewith. The program code is executable by a processor to perform a method. The method can include, responsive to detecting an object turning toward the autonomous vehicle in an external environment, determining whether the detected object will impinge upon the autonomous vehicle. The method can also include, responsive to determining that the detected object will impinge upon the autonomous vehicle, determining a driving maneuver for the autonomous vehicle to avoid being impinged upon by the detected object. The method can further include causing the autonomous vehicle to implement the determined driving maneuver.

DETAILED DESCRIPTION

This detailed description relates to mitigating risk for an autonomous vehicle relative to objects that are turning toward the autonomous vehicle. More particularly, it can be determined whether a detected turning object will impinge upon the autonomous vehicle. Responsive to determining that the detected turning object will impinge upon the autonomous vehicle, a driving maneuver for the autonomous vehicle can be determined to avoid being impinged upon by the detected turning object. The present detailed description relates to systems, methods and computer program products that incorporate such features. In at least some instances, such systems, methods and computer program products can improve safety and/or performance of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4B, but the embodiments are not limited to the illustrated structure or application.

Figure 1:
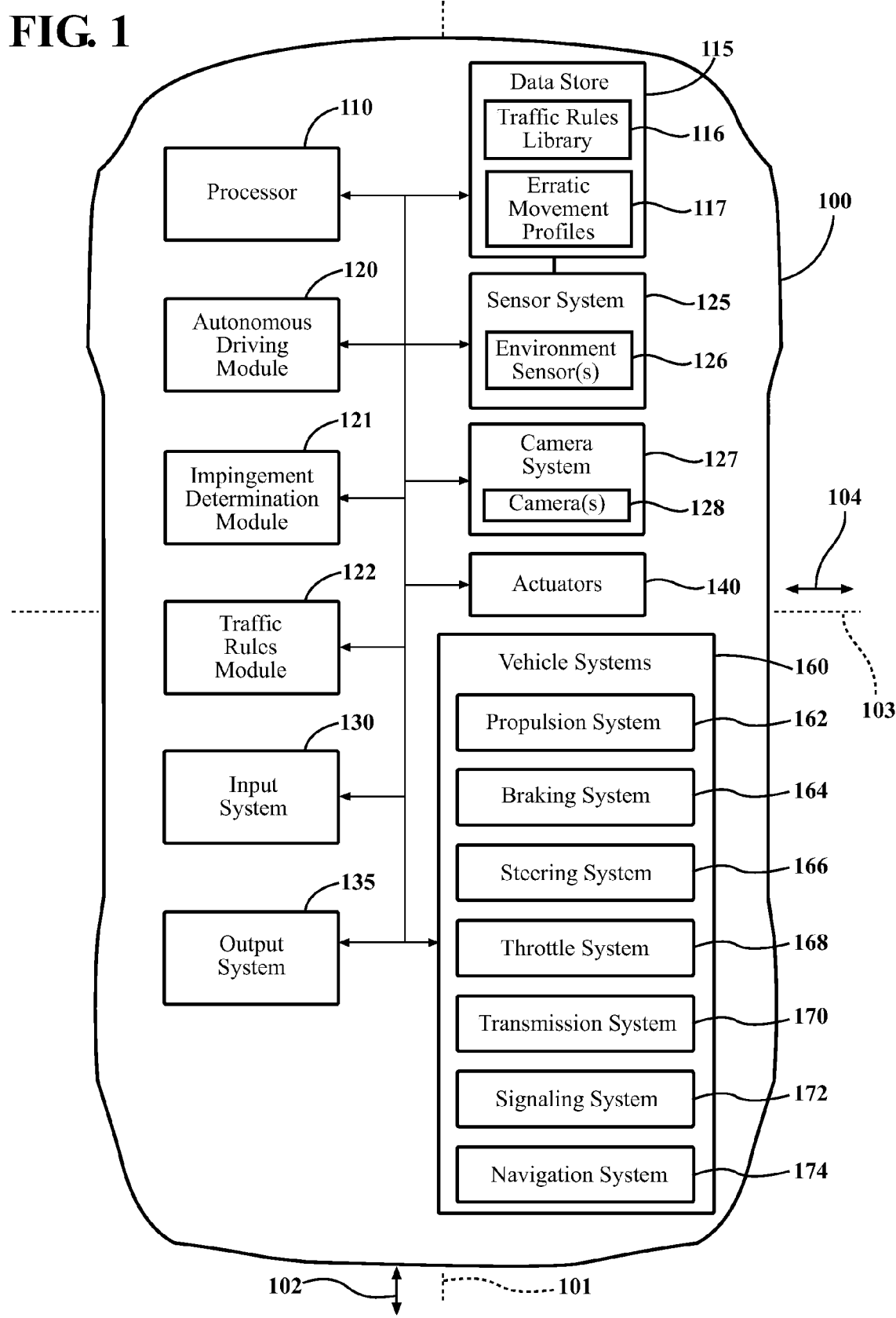
FIG. 1 is an example of an autonomous vehicle configured to mitigate risk with respect to turning objects.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can have an associated longitudinal axis 101, which can be the central axis of the vehicle 100. The vehicle 100 can have an associated longitudinal direction 102. "Longitudinal direction" means any direction that is substantially parallel to and/or co-linear with the longitudinal axis 101. The vehicle 100 can have an associated lateral axis 103, which can be substantially perpendicular to the longitudinal axis 101. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 104. "Lateral direction" means any direction that is substantially parallel to and/or co-linear with the lateral axis 103.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement various processes described herein, including, for example, determining an altered travel route for the autonomous vehicle and implementing the determined altered travel route. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 160). Alternatively or in addition, the data store 115 may contain such instructions.

The vehicle 100 can include an impingement determination module 121. The impingement determination module 121 can be implemented as computer readable program code that, when executed by a processor, implement various processes described herein. The impingement determination module 121 can be a component of the processor 110, or the impingement determination module 121 can be executed on and/or distributed among other processing systems to which the processor 110 is operatively connected.

Figure 3A:
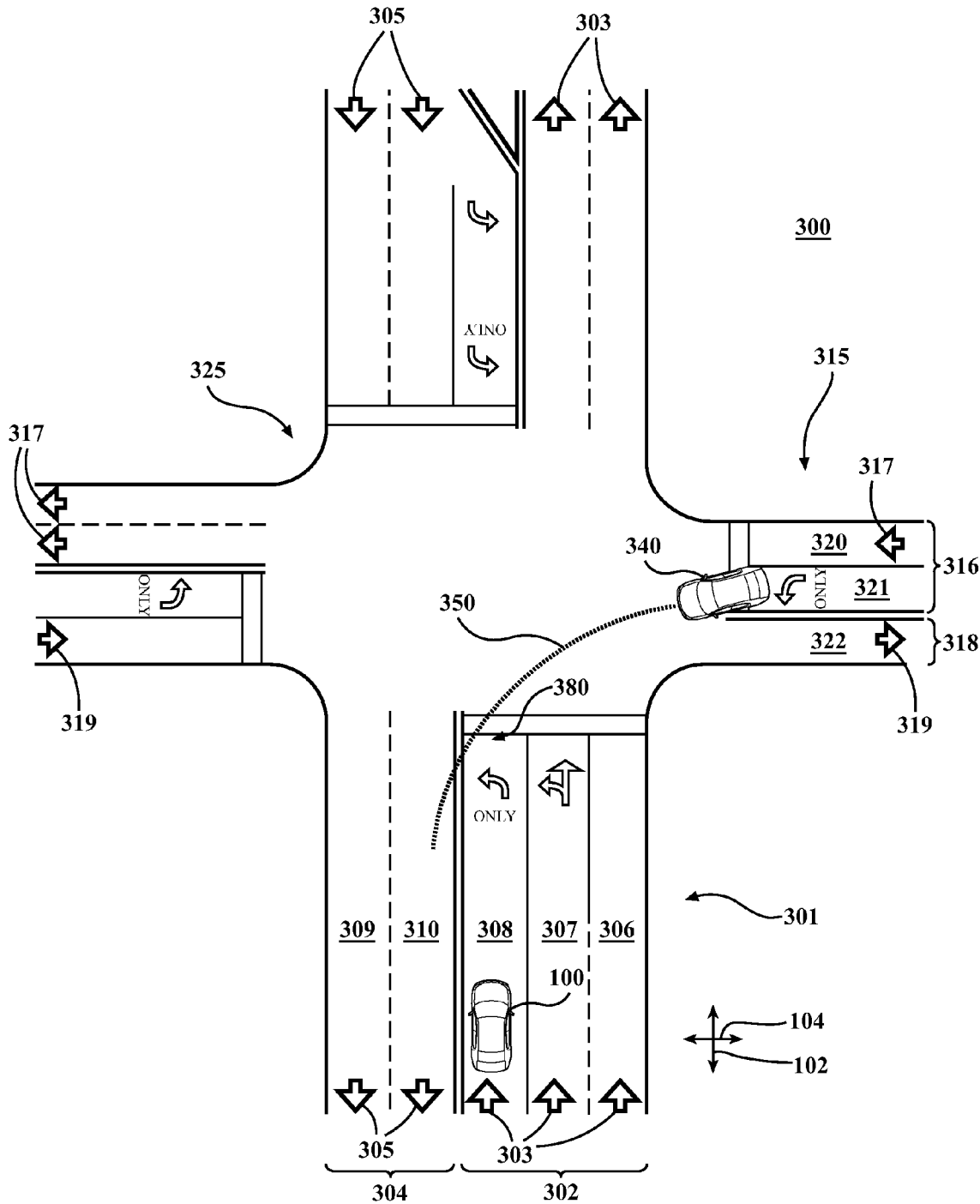
FIG. 3A is an example of an environment in which an autonomous is approaching an intersection and another vehicle is turning toward the autonomous vehicle.
Figure 3B:
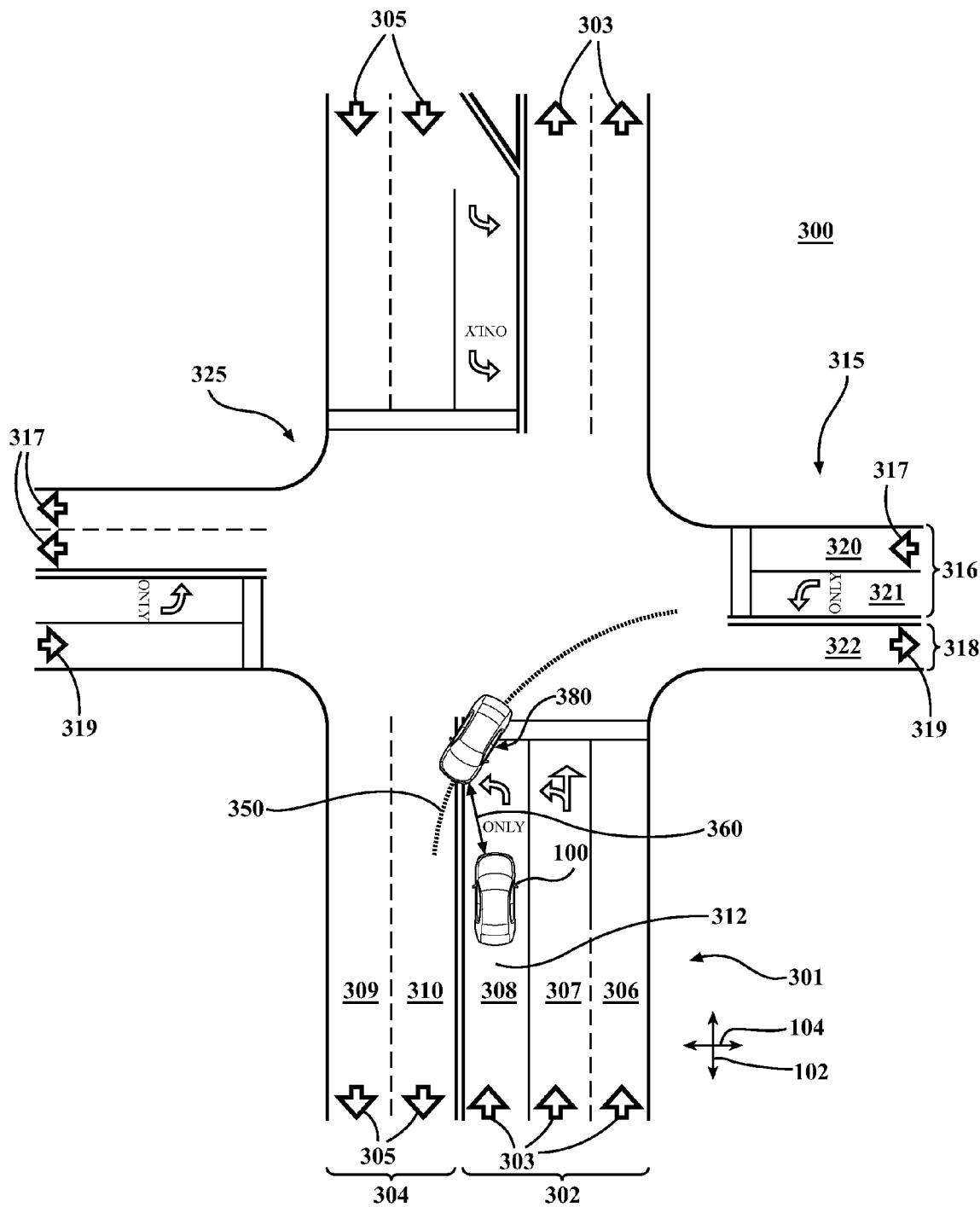
FIG. 3B is an example of the environment of FIG. 3A, showing the autonomous vehicle implementing a driving maneuver to avoid being impinged upon by the turning vehicle.
Figure 4A:
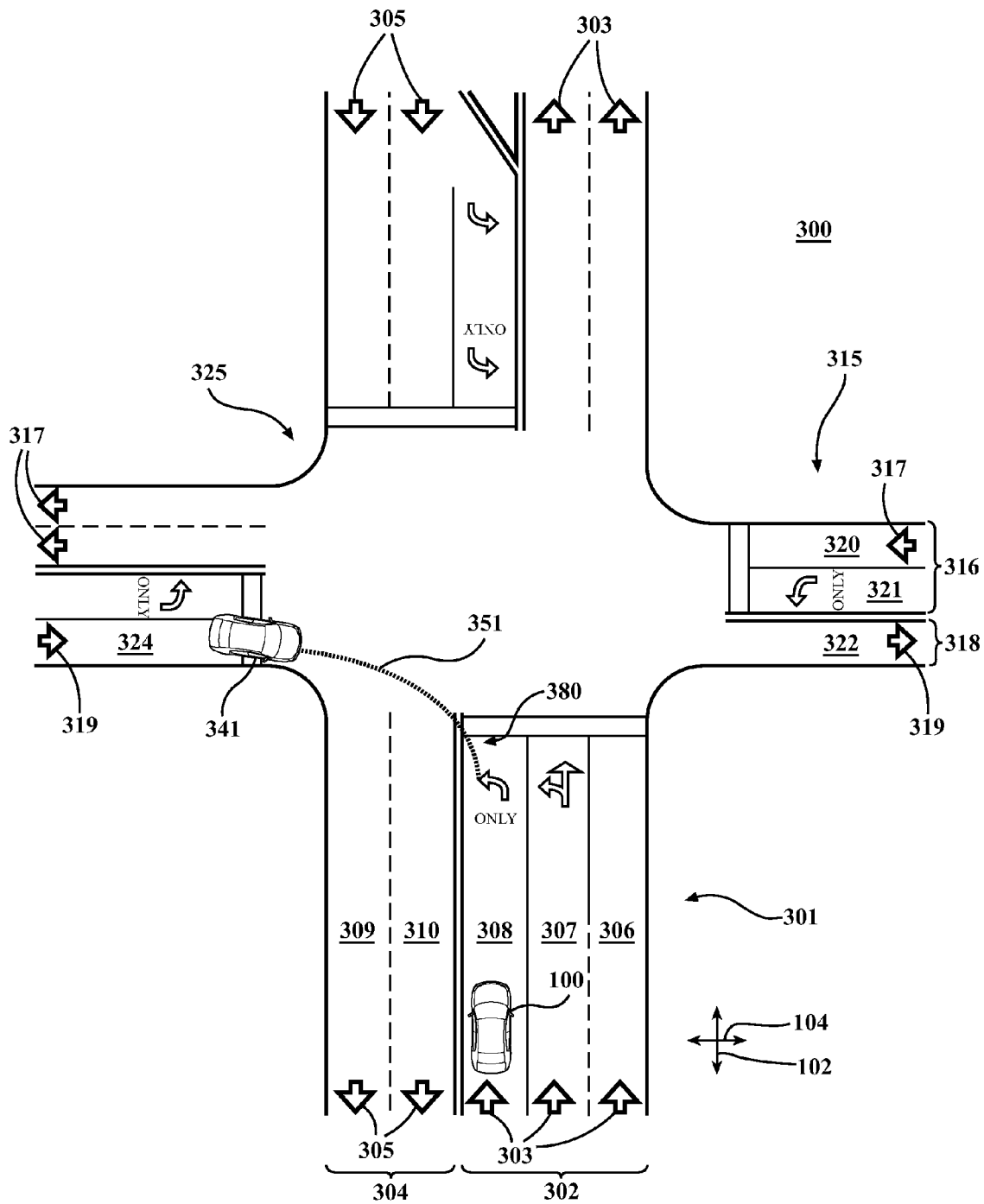
FIG. 4A is an example of an environment in which an autonomous vehicle is approaching an intersection and another vehicle is turning toward the autonomous vehicle.
Figure 4B:
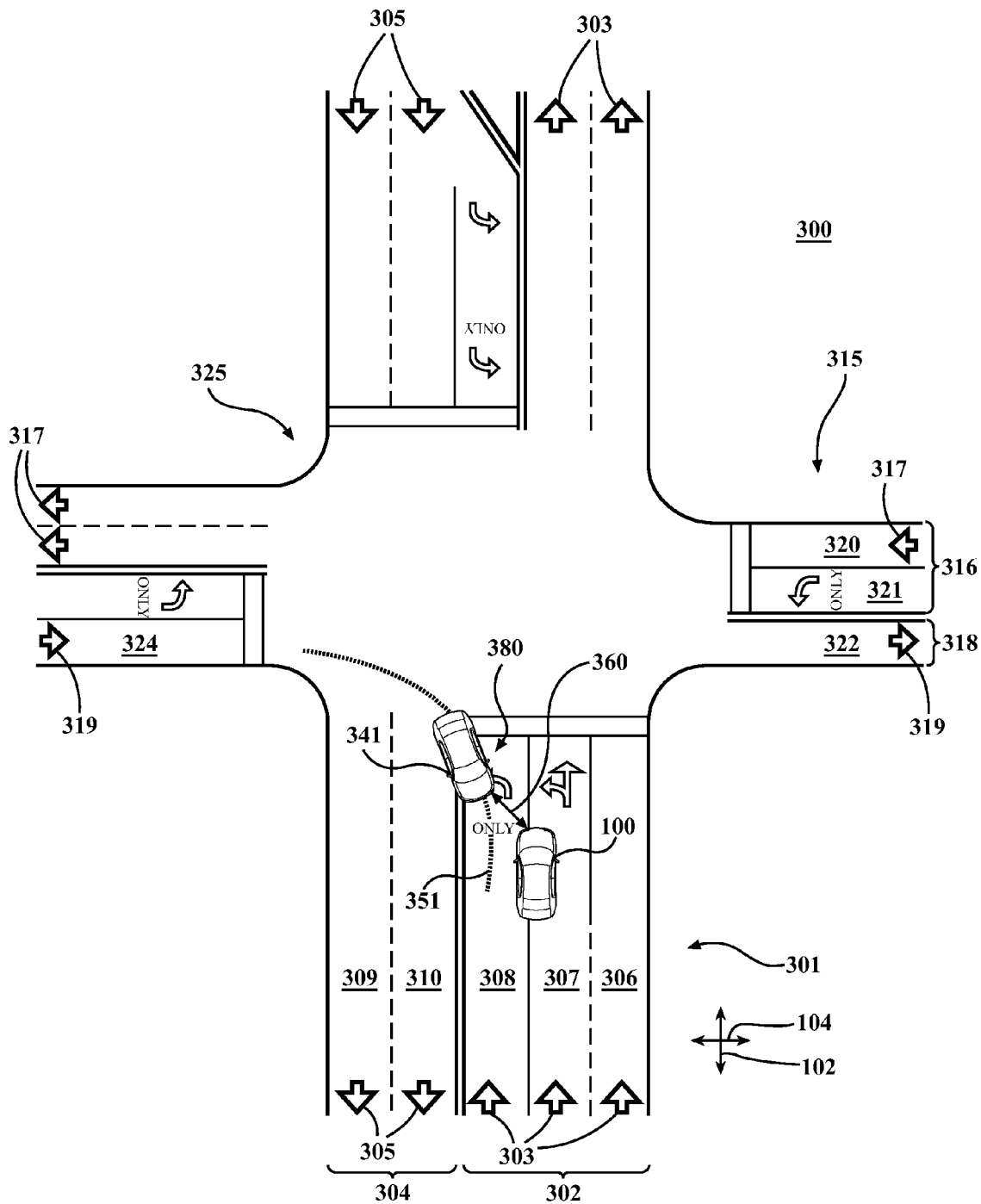
FIG. 4B is an example of the environment of FIG. 4A, showing the autonomous vehicle implementing a driving maneuver to avoid being impinged upon by the turning vehicle.

The impingement determination module 121 can be configured to detect, analyze, assess and/or interpret information about detected turning objects to determine whether such objects will impinge upon the vehicle 100. As used herein, "turning object" is an object that is turning toward a vehicle. The turning object can be turning toward the vehicle from a transverse direction relative to a travel direction of the vehicle. FIGS. 3A-3B show an example in which the turning object is another vehicle 340 that is turning left toward the vehicle 100 from a transverse direction. FIGS. 4A-4B show an example in which the turning object is another vehicle 341 that is turning right toward the vehicle 100 from a different transverse direction.

The turning object can be making any type of turn. For instance, in the scenarios illustrated in FIGS. 3A-3B and 4A-B, the vehicles 340, 341 are making a substantially 90 degree turns. However, it will be understood that arrangements described herein can be used in connection with objects that are turning at other angles, including angles that are greater than or less than 90 degrees.

The impingement determination module 121 can determine whether the turning object would impinge upon the vehicle 100. "Impinge upon" means that the turning object and/or the vehicle are moving in such a manner that would cause them to come substantially close to each other. "Substantially close" means that the vehicle and the turning object directly contact each other and/or are located within a predetermined distance of each other. The predetermined distance can be any suitable value, including, for example, about 20 feet or less, about 15 feet or less, about 10 feet or less, about 5 feet or less, about 4 feet or less, about 3 feet or less, about 2 feet or less or about 1 foot or less.

The determination of whether a detected turning object will impinge upon the vehicle 100 can be made in any suitable manner. For instance, in one or more arrangements, the impingement determination module 121 can predict whether the turning object and the vehicle 100 will come substantially close to each other. Such a prediction can be made based on one or more factors, including, for example, the current travel route of the vehicle 100, the current location of the vehicle 100, a predicted future location of the vehicle 100, the current trajectory of the vehicle 100, a predicted trajectory of the vehicle 100, the current speed of the vehicle 100, a future speed of the vehicle 100, the current driving maneuver(s) of the vehicle 100, future driving maneuver(s) of the vehicle 100, the past, current or future location of the turning object, the current or future trajectory of the turning object, and/or the past or current speed of the turning object, just to name a few possibilities. In one or more arrangements, artificial or computational intelligence algorithms or machine learning approaches can be used for predicting whether the turning object and the vehicle 100 will come substantially close to each other and/or for determining one or more predicted factors. If it is predicted that the turning object and the vehicle 100 will be substantially close to each other, then it can be determined that the turning object will impinge upon the vehicle 100.

Alternatively or in addition, the impingement determination module 121 can determine whether a turning object will impinge upon the vehicle 100 based on the actual or predicted position and/or movement of the turning object. For instance, if the turning object moves at least partially into a current travel lane of the vehicle 100, then it can be determined that the turning object will impinge upon the vehicle 100. Alternatively or in addition, if the turning object is moving in manner that is predicted to result in the turning vehicle moving at least partially into the current travel lane of the vehicle 100, then it can be determined that the turning object will impinge upon the vehicle 100.

Alternatively or in addition, the impingement determination module 121 and/or the traffic rules module 122 can determine whether the turning object is moving in manner that violates a traffic rule, then it can be determined that the turning object will impinge upon the vehicle 100. Examples of traffic rule violations include: traveling at a speed that exceeds the current posted speed limit, passing through a stop sign or a red traffic signal without stopping, and/or failing to drive within a single travel lane (e.g. a single turn lane), just to name a few possibilities. If a turning object is detected or determined to be violating a traffic rule, then it can be determined that the turning object will impinge upon the vehicle 100.

Alternatively or in addition, the impingement determination module 121 can determine that the turning object will impinge upon the vehicle 100 if the movement of the turning object is erratic. For instance, the turning object can be considered to be moving erratically if it is moving in a swerving manner, sliding manner or other erratic manner. Swerving or erratic movement can be identified by comparing the detected movement of the turning object to a set of predefined erratic movement profiles 117. In one or more arrangements, the set of predefined erratic movement profiles 117 can be included as part of one or more of the data stores 115. In one or more arrangements, the set of predefined erratic movement profiles 117 can be included as part of the impingement determination module 121. In one or more arrangements, one or more of the set of predefined erratic movement profiles 117 can be directed to sliding motions, such as may occur when a turning object is moving on a wet, icy or snowy road. In one or more arrangements, one or more of the set of predefined erratic movement profiles 117 can be directed to swerving motions, such as may occur when a turning object is being operated by an intoxicated, drowsy and/or distracted driver.

In one or more arrangements, the impingement determination module 121 can be configured to compare the detected movement of a turning object to a set of predefined erratic movement profiles 117 to determine if there is a match. Match" or "matches" means that the detected movement of a turning object and one of the predefined erratic movement profiles in the set of predefined erratic movement profiles are identical. In some embodiments, "match" or "matches" can also mean that the detected movement of the turning object and one of the predefined erratic movement profiles in the set of predefined erratic movement profiles are substantially identical. For instance, the detected movement of the turning object and one of the predefined erratic movement profiles in the set of predefined erratic movement profiles can match within a predetermined probability (e.g., at least about 85%, at least about 90%, at least about 95% or greater) or confidence level. In one or more arrangements, the determination of the extent to which the detected movement of the turning object matches with one of the predefined erratic movement profiles can be performed using artificial or computational intelligence algorithms or machine learning methods.

The impingement determination module 121 can include instructions (e.g., program logic) executable by the processor 110. Such instructions can include instructions to analyze data/information acquired by a sensor system 125 of the vehicle 100 to determine whether a turning object will impinge upon the vehicle 100. Alternatively or in addition, the data store 115 may contain such instructions.

The vehicle 100 can include a traffic rules module 122. The traffic rules module 122 can be implemented as computer readable program code that, when executed by a processor, implement the various processes described herein. For instance, the traffic rules module 122 can be configured to determine whether a detected turning object is moving in compliance with one or more traffic rules. Alternatively or in addition, the traffic rules module 122 can be configured to determine whether the vehicle 100 is operating in compliance with one or more traffic rules. Alternatively or in addition, the traffic rules module 122 can be configured to determine whether at least a portion of a current travel route of the vehicle 100 and/or a driving maneuver would violate one or more traffic rules. The traffic rules module 122 can be a component of the processor 110. Alternatively or in addition, the traffic rules module 122 can be executed on and/or distributed among other processing systems to which the processor 110 is operatively connected.

In one or more arrangements, the traffic rules module 122 can be operatively connected to one or more traffic rules libraries 116. The one or more traffic rules libraries 116 can be included as part of one or more of the data stores 115. The traffic rules library 116 can include a set of traffic rules. The term "set of traffic rules" means one or more traffic rules. As used herein, "Traffic rule" is any law, rule, ordinance or authority that governs the operation of a motor vehicle, including motor vehicles in motion and motor vehicles that are parked or otherwise not in motion. The traffic rules can be international, federal, national, state, city, township and/or local laws, rules, ordinances and/or authorities.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100 and/or an autonomous driving system.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 102, the lateral direction 104 and/or other direction(s)), the speed of each detected object and/or the movement of each detected object.

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 102, the lateral direction 104 and/or other direction(s)), the speed of each detected object and/or the movement of each detected object.

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 102, lateral direction 104 and/or other direction(s)), the speed of each detected object and/or the movement of each detected object. Such detecting can be based on a characteristic (e.g. the intensity) of a reflected ultrasonic signal.

In some arrangements, the sensor system 125, the processor 110, and/or one or more of the modules 120, 121, 122 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 121, 122 can be configured to detect, determine, assess, monitor, measure, quantify and/or sense, directly or indirectly, the size, relative size, length, width, height, a dimension, the material, a material property, the speed, the acceleration and/or the trajectory of a detected object. In one or more arrangements, one or more artificial or computational algorithms or machine learning methods can be used for such purposes.

Alternatively or in addition to any of the sensors described above, the sensor system 125 can include other types of sensors. The sensor system 125, the processor 110 and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The autonomous driving module 120, the impingement determination module 121, the traffic rules module 122 and/or the processor 110 can be configured to analyze information/data captured by the sensor system 125 with respect to turning objects in an external environment. For instance, the impingement determination module 121 can analyze information/data captured by the sensor system 125 to determine whether the turning object will impinge upon the vehicle 100.

The vehicle 100 can include a camera system 127. In one or more arrangements, the camera system 127 can be a part of the sensor system 125. The camera system 127 can include a one or more cameras 128. "Camera" is defined as any device, component, and/or system that can capture visual data. "Visual data" includes video and/or image information/data. The visual data can be in any suitable form.

In one or more arrangements, one or more of the cameras 128 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras 128 can be configured with zoom in and/or zoom out capabilities.

In one or more arrangements, one or more of the cameras 128 can be externally facing. "Externally facing" means a camera that is oriented, positioned, configured, operable and/or arranged to capture visual data from at least a portion of the external environment of the vehicle 100. The one or more cameras 128 can be located in any suitable portion of the vehicle 100. For instance, one or more of the cameras 128 can be located within the vehicle 100. One or more of the cameras 128 can be located on the exterior of the vehicle 100. One or more of the cameras 128 can be located on or exposed to the exterior of the vehicle 100.

The position of one or more of the cameras 128 can be fixed such that its position does not change relative to the vehicle 100. One or more of the cameras 128 can be movable so that its position can change to allow visual data from different portions of the external environment of the vehicle 100 to be captured. The movement of such cameras 128 can be achieved in any suitable manner. For instance, the cameras 128 can be rotatable about one or more axes, pivotable, slidable and/or extendable, just to name a few possibilities. In one or more arrangements, the cameras 128 can have any suitable range of motion, including, for example, substantially spherical, substantially hemi-spherical, substantially circular and/or substantially linear. The one or more cameras 128 and/or the movements of the one or more cameras 128 can be controlled by the camera system 127, the sensor system 125, the processor 110 and/or one or more of the modules 120, 121, 122.

The autonomous driving module 120, the impingement determination module 121, the traffic rules module 122 and/or the processor 110 can be configured to analyze visual data captured by the camera system 127 to identify one or more turning objects in the external environment. In some arrangements, one or more of these elements can be configured to identify the nature of the turning objects (e.g. whether the turning object is a vehicle) using any suitable technique, including, for example, template matching, computer vision and/or image processing techniques and/or other artificial or computational intelligence algorithms or machine learning methods.

The vehicle 100 can include an input system 130 for receiving input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135 for presenting information to the driver or passenger. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include one or more vehicle systems 160. Various examples of the one or more vehicle systems 160 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 162. The propulsion system 162 can include one or more mechanisms, devices, elements, components, systems, and/or combinations thereof, now known or later developed, configured to provide powered motion for the vehicle 100. The propulsion system 162 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 164. The braking system 164 can include one or more mechanisms, devices, elements, components, systems, and/or combinations thereof, now known or later developed, configured to decelerate the vehicle 100. As an example, the braking system 164 can use friction to slow the wheels/tires. The braking system 164 can convert the kinetic energy of the wheels/tires to electric current.

Further, the vehicle 100 can include a steering system 166. The steering system 166 can include one or more mechanisms, devices, elements, components, systems, and/or combinations thereof, now known or later developed, configured to adjust the heading of the vehicle 100.

The vehicle 100 can include a throttle system 168. The throttle system 168 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 172. The signaling system 172 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 172 can provide information regarding the vehicle's presence, position, size, direction of travel, and/or the driver's intentions regarding direction and speed of travel. For instance, the signaling system 172 can include headlights, taillights, brake lights, hazard lights and turn signal lights.

The vehicle 100 can include a navigation system 174. The navigation system 174 can include one or more mechanisms, devices, elements, components, systems, applications and/or combinations thereof, now known or later developed, configured to determine the geographic location of the vehicle 100 and/or to determine a travel route for the vehicle 100.

The navigation system 174 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 174 can be configured to update the travel route dynamically while the vehicle 100 is in operation.

The navigation system 174 can include a global positioning system, a local positioning system or a geolocation system. The navigation system 174 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 174 can use Transmission Control Protocol (TCP) and/or a Geographic information system (GIS) and location services.

The navigation system 174 may include a transceiver configured to estimate a position of the vehicle 100 with respect to the Earth. For example, navigation system 174 can include a GPS transceiver to determine the vehicle's latitude, longitude and/or altitude. The navigation system 174 can use other systems (e.g. laser-based localization systems, inertial-aided GPS, and/or camera-based localization) to determine the location of the vehicle 100.

Alternatively or in addition, the navigation system 174 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 160 and/or individual components thereof. For example, returning to FIG. 1, the processor 110 and/or the autonomous driving module 120 can be in communication to send and/or receive information from the various vehicle systems 160 to control the movement, speed, maneuvering, heading, direction, etc. of vehicle 100. The processor 110 and/or the autonomous driving module 120 may control some or all of these vehicle systems 160 and, thus, may be partially or fully autonomous.

The processor 110 and/or the autonomous driving module 120 may be operable to control the navigation and/or maneuvering of the vehicle 100 by controlling one or more of the vehicle systems 160 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 160 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for risk mitigation with respect to turning objects. More particularly, the vehicle 100 can be configured for risk mitigation with respect to turning objects when the vehicle 100 is approaching an intersection. Still more particularly, the vehicle 100 can be configured for risk mitigation with respect to turning objects when the vehicle 100 is approaching an intersection in a turn lane (e.g. a left turn lane). In one or more arrangements, the vehicle 100 can be configured so that, responsive to determining that a turning object will impinge upon the vehicle 100, a driving maneuver for the vehicle 100 can be determined to avoid being impinged upon by the turning object.

In one or more arrangements, the processor 110, the autonomous driving module 120 and/or the navigation system 174 can be configured to determine the driving maneuver. A "driving maneuver" means an operation of a vehicle that would result in a change in the movement and/or position of the vehicle. One example of a driving maneuver is moving the vehicle 100 in the lateral direction 104 away from the turning object. Another example of a driving maneuver is stopping short of an originally intended stopping point.

In one or more arrangements, at least a portion of the determined driving maneuver can include the vehicle 100 safely violating a traffic rule. Examples of violating a traffic rule include driving and/or stopping partly in a plurality of travel lanes (e.g. two travel lanes), driving at least partially on a shoulder of a road, exceeding the speed limit, stopping in a travel lane, driving at least partially on an emergency lane, changing lanes without signaling, and/or driving at least partially off the road, just to name a few possibilities. "Safely violate a traffic rule" means that at least a portion of the determined driving maneuver would violate a traffic rule, but it would not result in damage, injury or endangerment of the vehicle 100, its occupants, and/or persons or property located in the external environment (e.g. by collision). If at least a portion of the driving maneuver would cause the vehicle 100 to violate a traffic rule but would also result in an object in the external environment being struck by the vehicle, then the altered travel route would not be considered to safely violate a traffic rule.

Figure 2:
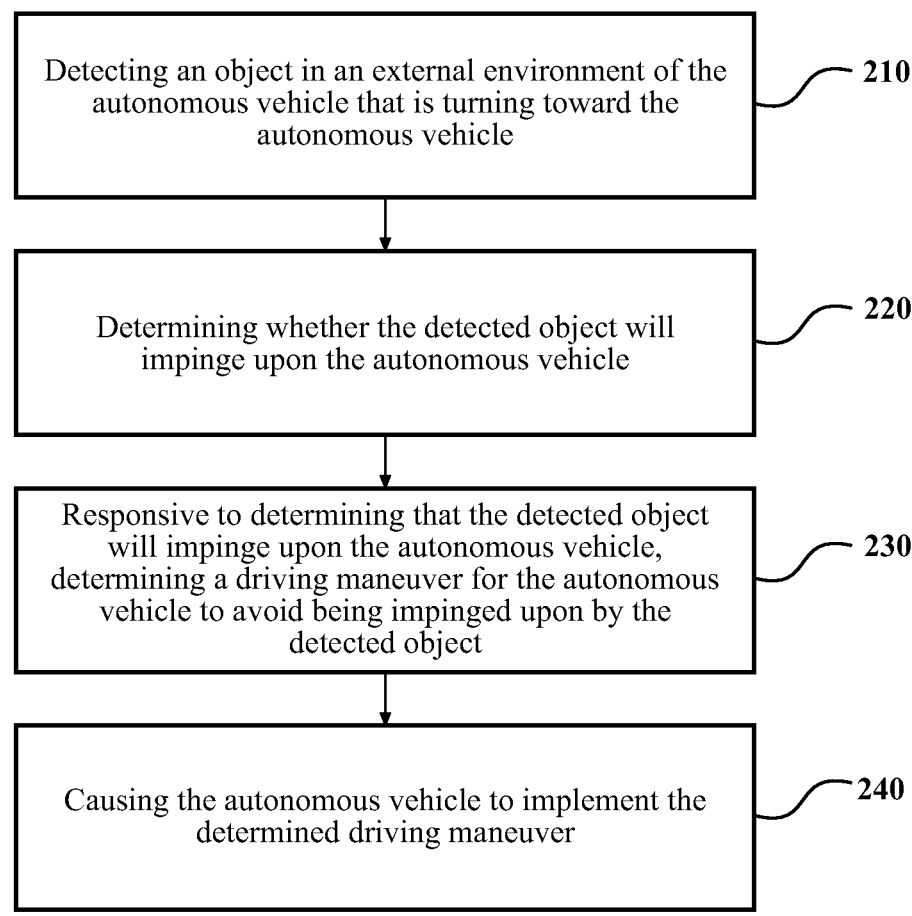
FIG. 2 is an example of a method of mitigating risk for an autonomous vehicle with respect to turning objects.

Now that the various potential systems, devices, elements and/or components of the vehicle 100 have been described, various methods for an autonomous vehicle to mitigate risk relative to a turning object will now be described. Referring now to FIG. 2, an example of a method of mitigating risk relative to a turning object is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, the external environment of the vehicle 100 can be detected to determine if there is a turning object therein that is turning from a transverse direction toward the autonomous vehicle. In one or more arrangements, the detecting of the external environment can be performed by one or more sensors of the sensor system 125, such as the environment sensor(s) 126 and/or by the camera system 127. In some arrangements, the detecting of the external environment can be performed continuously or at any suitable interval.

If an object turning toward the vehicle 100 is detected, the method 200 can continue to block 220. However, if an object turning toward the vehicle 100 is not detected, the method 200 can return to block 210, or the method 200 can end.

At block 220, it can be determined whether the detected object will impinge upon the vehicle 100. If it is determined that the detected object will not impinge upon the autonomous vehicle, the method 200 can return to block 210 or block 220, or the method 200 can end. If it is determined that the detected object will impinge upon the vehicle 100, the method 200 can continue to block 230.

At block 230, responsive to determining that the detected object will impinge upon the vehicle 100, a driving maneuver for the vehicle 100 to avoid being impinged upon by the detected object can be determined. The method 200 can continue to block 240.

At block 240, the vehicle 100 can be caused to implement the determined driving maneuver. In one or more arrangements, the processor 110 and/or the autonomous driving module 120 can cause the vehicle 100 to implement the determined driving maneuver. The processor 110 and/or the autonomous driving module 120 can be operatively connected to one or more of the vehicle systems 160 to implement the determined driving maneuver. In one or more arrangements, the processor 110 and/or the autonomous driving module 120 can be operable to control the one or more actuators 140, which can control one or more of the vehicle systems 160 or portions thereof to implement the determined driving maneuver.

When the determined driving maneuver is implemented, the method 200 can end. Alternatively, the method 200 can return to block 210. In some instances, once the turning object has passed the vehicle 100, the vehicle 100 can take any suitable action. For instance, the vehicle 100 can remain in its current position (e.g. its position after implementing the driving maneuver). Alternatively, the vehicle 100 can discontinue the implemented driving maneuver. Alternatively, the vehicle 100 can be caused to move so that it does not violate a traffic rule. Alternatively, the vehicle 100 can resume its travel route.

It should be noted that, in one or more arrangements, a driver or other passenger of the vehicle 100 can be prompted to provide permission to implement the determined driving maneuver. In some arrangements, such prompting may occur only if it is determined that there is sufficient time to receive a responsive input from the driver or passenger to implement the determined driving maneuver. In some arrangements, such prompting may occur only if it is determined that the driving maneuver would safely violate a traffic rule.

The driver or other passenger can be prompted in any suitable manner. For instance, a prompt can be presented on a display within the vehicle 100. Alternatively or in addition, the prompt can be audibly output to the driver or other passenger over one or more audial channels. Other forms of prompting can be used as an alternative or in addition to the above-described forms of prompting.

The vehicle occupant (e.g. a driver and/or a passenger) can selectively grant or deny permission to implement the determined driving maneuver in any suitable manner. For instance, a vehicle occupant can input the grant or denial of permission using one or more components of the input system 130. As an example, the vehicle occupant can provide an input through a touch screen, button, switch or other in-vehicle user interface element. In some arrangements, the vehicle occupant can provide an input through engagement with one or more vehicle components (e.g. turn signal, brake pedal, gas pedal, etc.). A "user interface element" is defined as a component or a group of components that enables a user to interact with a machine. In one or more arrangements, the vehicle occupant can provide an input by speaking aloud whether permission is granted or denied.

If an input is received granting permission, the method 200 can continue to block 240 where, as noted above, the determined driving maneuver can be implemented. If an input is received denying permission, then the vehicle 100 can take any suitable action, such as presenting a warning, switching to manual operation, determining a different driving maneuver or taking a system default action.

If an input is not received from the driver or passenger, the vehicle 100 can be automatically caused to implement the determined driving maneuver or some other system default driving maneuver and/or action. In some arrangements, a predetermined amount of time can be given for the driver or passenger to provide an input. The predetermined amount of time can be any suitable amount of time. The predetermined amount of time can vary depending on the circumstances in the environment. If an input is not received within the predetermined amount of time, the determined driving maneuver can be implemented or another system default driving maneuver can be implemented.

One non-limiting example of the operation of the vehicle 100 in accordance with the method 200 will now be described in relation to FIGS. 3A and 3B. For purposes of this example, the vehicle 100 can be traveling in an environment 300 that includes a first road 301 and a second road 315. The first road 301 and the second road 315 can cross each other to form an intersection 325. In one or more arrangements, traffic with respect to the intersection 325 can be regulated using any suitable traffic control device (e.g. stop signs, traffic lights, etc.). In one or more arrangements, the intersection 325 may not have an associated traffic control device. The first road 301 and the second road 315 can be oriented at any suitable angle with respect to each other. For instance, the first road 301 and the second road 315 can be oriented at substantially 90 degrees relative to each other, as is shown in FIGS. 3A and 3B. However, in one or more arrangements, the first road 301 and the second road 315 can be oriented at an acute angle with respect to each other. In one or more arrangements, the first road 301 and the second road 315 can be angled at an obtuse angle with respect to each other. Further, in some arrangements, the intersection 325 can be formed by more than two roads.

As used herein, "road" means a thoroughfare, route, path or way between two places and upon which a vehicle can travel. A road may be paved or otherwise improved to facilitate travel by a vehicle thereon. In some instances, a road may be unpaved or undeveloped. A road may be a public road or a private road. A road can include or be a part of one or more bridges, tunnels, supporting structures, junctions, crossings, interchanges, and toll roads.

The first road 301 and the second road 315 can have any suitable configuration and/or layout. The first road 301 and/or the second road 315 can be designated for two way travel, including a plurality of travel lanes. A "travel lane" is a portion of a road that is designated for use by a single line of vehicles and/or a portion of a road that is being used by a single line of vehicles. In some instances, the one or more travel lanes can be designated by markings on the road or in any other suitable manner. In some instances, the one or more travel lanes may not be marked.

For purposes of this example, the first road 301 can include a first set of one or more travel lanes 302 and a second set of one or more travel lanes 304. The first set of travel lanes 302 can be intended or designated for vehicular travel in a first direction 303. The second set of travel lanes 304 can be intended or designated for vehicular travel in a second direction 305. The first direction 303 can be substantially opposite to the second direction 305.

The first set of travel lanes 302 and the second set of travel lanes 304 can include any suitable type and/or quantity of travel lanes. For instance, FIGS. 3A and 3B show an example in which, at least which respect to the portion of the first road 301 below the intersection 325, the first set of travel lanes 302 can include a travel lane 306, a dual travel lane and left turn lane 307, and a dedicated left turn lane 308. The second set of travel lanes 304 can include two travel lanes 309, 310.

The second road 315 can include a third set of one or more travel lanes 316 and a fourth set of one or more travel lanes 318. The third set of travel lanes 316 can be intended or designated for vehicular travel in a third direction 317. The fourth set of travel lanes 318 can be intended or designated for vehicular travel in a fourth direction 319. The third direction 317 can be substantially opposite to the fourth direction 319.

The third set of travel lanes 316 and the fourth set of travel lanes 318 can include any suitable type and/or quantity of travel lanes. For instance, FIGS. 3A and 3B show an example in which, at least with respect to the portion of the second road 315 to the right of the intersection 325, the third set of travel lanes 316 can include a travel lane 320 and a dedicated left turn lane 321. The fourth set of travel lanes 318 can include a travel lane 322.

It will be understood that arrangements shown and described herein with respect to the first road 301, the second road 315 and/or the intersection 325 are provided merely as examples, and arrangements are not limited to the particular arrangements shown and described. Indeed, arrangements described herein can be used in connection with roads having any quantity, type and/or arrangement of travel lanes.

Referring to FIG. 3A, the vehicle 100 can be traveling on the first road 301. The current travel path of the vehicle 100 can include turning left onto the second road 315. The vehicle 100 can be approaching the intersection 325 while traveling in the first direction 303. As it approaches the intersection 325, the current travel lane of the vehicle 100 can be the dedicated left turn lane 308. "Current travel lane" means a travel lane in which a vehicle is traveling at a present moment in time. As the vehicle 100 approaches the intersection 325, the vehicle 100 can be presented with an indication to stop, such as by a traffic control device.

Another vehicle 340 can be traveling on the second road 315. The current travel lane of the other vehicle 340 can be left turn lane 321. The other vehicle 340 can be approaching the intersection 325 traveling in the third direction 317, which is transverse to the first direction 303. The other vehicle 340 can be preparing to make or in the process of making a left turn onto the first road 301. Thus, the other vehicle 340 is considered to be turning toward the vehicle 100.

The vehicle 100 can detect the environment 300, such as by using the sensor system 125 and/or the camera system 127. The vehicle 100 can detect the presence of objects in the environment 300 and the movement of such objects. Accordingly, the vehicle 100 can detect the presence of the other vehicle 340 and that it is turning toward the vehicle 100.

The vehicle 100 can determine whether the detected other vehicle 340 will impinge upon the vehicle 100. The determination of whether the other vehicle 340 will impinge upon the vehicle 100 can be performed by the processor 110 and/or the impingement determination module 121. Such a determination can be made in any suitable manner, including in any of the ways described above. For this example, a future trajectory 350 of the other vehicle 340 can be predicted. Such a prediction can be made in any suitable manner. For instance, the prediction can be made by extrapolating the recent movements of the other vehicle 340. In the scenario shown in FIG. 3A, the future trajectory 350 can include crossing at least partially into the current travel lane of the vehicle 100 (e.g. the left turn lane 308). As a result of such a prediction, it can be determined that the other vehicle 340 will impinge upon the vehicle 100. Again, it will be understood that this is merely one example of a way in it can be determined whether a turning object will impinge upon the vehicle 100, and arrangements described herein are not limited to this example.

Responsive to determining that the other vehicle 340 will impinge upon the vehicle 100, a driving maneuver for the vehicle 100 can be determined to avoid the other vehicle 340 impinging upon by the vehicle 100. For instance, the driving maneuver can include stopping short of an intended stopping point in the current travel lane.

Alternatively or in addition, the driving maneuver can include moving backward substantially in the longitudinal direction 102. More particularly, the driving maneuver can include moving safely backward substantially in the longitudinal direction 102 at least partially within the current travel lane of the vehicle 100. "Safely backward" means that the vehicle can move backward without contacting another object (e.g. another vehicle) located behind the vehicle. Thus, while moving backward, the vehicle 100 can sense a rear environment 312 (FIG. 3B) of the vehicle 100 for the presence of objects (e.g. other vehicles) in the rear environment 312. For instance, such object may be located behind the vehicle 100 and/or approaching the vehicle 100 from behind.

If no objects are detected in the rear environment 312 or no objects are detected within a predetermined distance from the vehicle 100, then it can be determined that the vehicle 100 can move safely backward. In such case, the vehicle 100 can implement the driving maneuver. If one or more objects are detected in the rear environment of the vehicle 100 and it can be determined whether the space behind the vehicle 100 is sufficient or insufficient. If the space behind the vehicle 100 is sufficient, then the vehicle can implement the driving maneuver. The space behind the vehicle 100 can be determined to be sufficient if it is large enough for the vehicle 100 to move backward without contacting the detected object. The determination of whether the space behind the vehicle 100 is sufficient can be based on one or more factors, including, for example, the distance between the vehicle 100 and the detected object, the current or predicted speed of the object and/or the current or predicted speed of the vehicle 100. If the space behind the vehicle 100 is insufficient, then the vehicle 100 may not implement the driving maneuver or may discontinue the backward movement substantially in the longitudinal direction 102.

Alternatively or in addition, the driving maneuver can include moving the vehicle 100 substantially in the lateral direction 104 away from the other vehicle 340. The vehicle 100 can implement the driving maneuver within any suitable amount of time to avoid being impinged upon by the other vehicle 340. In one or more arrangements, the driving maneuver can be determined based on one or more factors, such as the speed of the vehicle 100, the speed of the other vehicle 340, the trajectory of the other vehicle 340, and/or the distance between the vehicle 100 and the other vehicle 340, just to name a few possibilities.

In one or more arrangements, the driving maneuver can be determined to maintain a minimum distance 360 (see FIG. 3B) between the vehicle 100 and the other vehicle 340. The minimum distance 360 can be measured in any suitable direction. The determination of the driving maneuver can be made by the autonomous driving module 120, the impingement determination module 121, the navigation system 174 and/or the processor 110. In one or more arrangements, the minimum distance can be a predetermined minimum distance. In one or more arrangements, the minimum distance can be fixed for all situations. Alternatively or in addition, in one or more arrangements, the minimum distance can vary based on one or more detected conditions of the environment 300.

The vehicle 100 can be caused (e.g. by the processor 110, the autonomous driving module 120 and/or the actuators 140) to implement the determined driving maneuver. For purposes of this example, the driving maneuver can be determined to be stopping short of an originally intended stopping point. An example of the vehicle 100 implementing such a driving maneuver is shown in FIG. 3B. As shown, the other vehicle 340 crosses partially into the current travel lane of the vehicle 100 (e.g. left turn lane 308). The vehicle 100 can stop short of an originally intended stopping point 380 in the left turn lane 308. Alternatively, if the vehicle 100 cannot stop short (e.g. if the vehicle 100 has moved too far in the current travel lane in the longitudinal direction 102 to avoid a predicted collision with the vehicle 340 and/or if the vehicle 100 has already reached the originally intended stopping point 380), the driving maneuver can be determined to be moving safely backward within the current travel lane of the vehicle 100. The driving maneuver can be implemented if sufficient space is available behind the vehicle 100. In one or more arrangements, the vehicle 100 can stop at a point to maintain the minimum distance 360 between the vehicle 100 and the other vehicle 340.

Once the other vehicle 340 has completed its turn and has passed the vehicle 100, the vehicle 100 can take any suitable action. For instance, the vehicle 100 can remain in place. Alternatively, the vehicle 100 can continue to the originally intended stopping point 380. The vehicle 100 can continue to sense the environment 300 to detect other turning objects. As a further alternative, the vehicle 100 can proceed with its intended travel path (e.g. making a left turn onto the second road 315) if it is appropriate to do so (e.g. a left turn signal is presented on a traffic control device).

Another non-limiting example of the operation of the vehicle 100 in accordance with the method 200 will now be described in relation to FIGS. 4A and 4B. For purposes of this example, the same environment 300 depicted in FIGS. 3A and 3B is presented. Accordingly, the above discussion of the first road 301, the second road 315 and the intersection 325 is equally applicable with respect to FIGS. 4A and 4B.

In the arrangement shown in FIG. 4A, the vehicle 100 can be traveling on the first road 301. The current travel path of the vehicle 100 can include a left turn onto the second road 315. The vehicle 100 can be approaching the intersection 325 while traveling in the first direction 303. As it approaches the intersection, the current travel lane of the vehicle 100 can be the dedicated left turn lane 308. As the vehicle 100 approaches the intersection 325, the vehicle 100 can be presented with an indication to stop, such as by a traffic control device.

Another vehicle 341 can be traveling on the second road 315. The current travel lane of the other vehicle 341 can be travel lane 324. The other vehicle 341 can be approaching the intersection 325 while traveling in the fourth direction 319, which is transverse to the first direction 303. The other vehicle 341 can be preparing to make or in the process of making a right hand turn onto the first road 301. Thus, the other vehicle 341 can be turning toward the vehicle 100.

The vehicle 100 can detect the environment 300, such as by using the sensor system 125 and/or the camera system 127. The vehicle 100 can detect the presence of objects in the environment 300 and the movement of such objects. Accordingly, the vehicle 100 can detect the presence of the other vehicle 341 and that it is turning toward the vehicle 100.

The vehicle 100 can determine whether the detected other vehicle 341 will impinge upon the vehicle 100. Such a determination can be made in any suitable manner, including in any of the ways described above. For this example, a future trajectory 351 of the other vehicle 341 can be predicted. In the scenario shown in FIG. 4A, the future trajectory 351 can include crossing at least partially into the current travel lane of the vehicle 100 (e.g. the left turn lane 308). As a result of such a prediction, it can be determined that the other vehicle 341 will impinge upon the vehicle 100.

Responsive to determining that the other vehicle 341 will impinge upon the vehicle 100, a driving maneuver for the vehicle 100 can be determined to avoid the other vehicle 341 from impinging upon by the vehicle 100. For purposes of this example, the driving maneuver can include moving the vehicle 100 substantially in the lateral direction 104 (e.g. in the fourth direction 319) away from the other vehicle 341.

In some arrangements, at least a portion of the driving maneuver can include violating a traffic rule. In this example, the driving maneuver can include the vehicle 100 moving partially into the travel lane 307 such that the vehicle 100 is simultaneously located in two travel lanes. The vehicle 100 can stop in such a position or can continue to travel in the first direction 303 in such a position. As a result, the vehicle 100 can be in violation of a traffic rule. However, it will be understood that moving at least partially into another travel is merely one example of a way in which a traffic rule can be violated. Further, it can be determined that the violation of the traffic rule can be performed safely. For instance, if the vehicle 100 does not detect the presence of any other objects in the travel lane 307, then the driving maneuver can be safely performed. Alternatively or in addition, the driving maneuver can include moving the vehicle 100 safely rearward substantially in the longitudinal direction 102 (e.g. in the second direction 305) if sufficient space behind the vehicle 100 is available. The rearward movement can occur at least partially within the current travel lane (e.g., turn lane 308) of the vehicle 100.

The vehicle 100 can be caused (e.g. by the processor 110, the autonomous driving module 120 and/or the actuators 140) to implement the determined driving maneuver. An example of the vehicle 100 implementing such a driving maneuver is shown in FIG. 4B. As shown, the other vehicle 341 crosses partially into the current travel lane of the vehicle 100 (e.g. left turn lane 308). The vehicle 100 can be caused to move at partially into adjacent travel lane 307. In one or more arrangements, the vehicle 100 can move a distance to maintain the minimum distance 360 (see FIG. 4B) between the vehicle 100 and the other vehicle 341. Once the other vehicle 341 has completed its turn and has passed the vehicle 100, the vehicle 100 can take any suitable action.

It will be appreciated that arrangements described herein can provide numerous benefits, including one or more of the benefits mentioned herein. For example, arrangements described herein can improve the performance of an autonomous vehicle by mitigating risk with respect to turning objects. Arrangements described herein can improve safety for autonomous vehicles by avoiding turning objects are predicted to impinge upon the autonomous vehicle. Further, arrangements described herein can provide for flexibility in the operation of the autonomous vehicle (e.g. by violating a traffic rule safely) while maintaining safety for the vehicle, occupants of the vehicle, the turning objects and other objects in the external environment of the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle stopped at an intersection while located in a current travel lane, the current travel lane being a left turn lane, the autonomous vehicle operating in a highly automated mode such that the autonomous vehicle navigates or maneuvers without receiving input from a vehicle occupant, the autonomous vehicle having a travel path that includes making a left turn through the intersection, the method comprising:

acquiring, using one or more sensors of a sensor system, sensor data of an external environment of the autonomous vehicle;

analyzing the acquired sensor data to detect whether an object is turning toward the autonomous vehicle from a direction that is transverse to a current travel direction of the autonomous vehicle;

responsive to detecting an object that is turning toward the autonomous vehicle from a direction that is transverse to the current travel direction of the autonomous vehicle, determining whether the detected object will impinge upon the autonomous vehicle by determining whether the detected object will pass through at least a portion of the current travel lane, whereby it is determined that the detected object will impinge upon the autonomous vehicle if the detected object will pass through at least a portion of the current travel lane;

responsive to determining that the detected object will impinge upon the autonomous vehicle, determining a driving maneuver for the autonomous vehicle to avoid being impinged upon by the detected object, the driving maneuver including moving the autonomous vehicle safely backward; and causing the autonomous vehicle to implement the determined driving maneuver.

2. The method of claim 1, wherein determining whether the detected object will impinge upon the autonomous vehicle further includes determining whether the detected object will pass within a predetermined distance from the autonomous vehicle.

3. The method of claim 1, wherein the driving maneuver further includes stopping short of an originally intended stopping point in a current travel lane of the autonomous vehicle.

4. The method of claim 1, wherein moving the autonomous vehicle safely backward includes moving the autonomous vehicle safely backward in substantially a longitudinal direction at least partially within a current travel lane of the autonomous vehicle.

5. The method of claim 1, wherein the driving maneuver further includes moving the autonomous vehicle substantially in a lateral direction away from the detected object.

6. The method of claim 1, wherein the driving maneuver further includes moving the autonomous vehicle at least partially into a travel lane that is adjacent to a current travel lane of the autonomous vehicle.

7. The method of claim 1, wherein at least a portion of the driving maneuver would safely violate a traffic rule.

8. The method of claim 1, further including:

prompting an occupant of the autonomous vehicle for permission to implement the determined driving maneuver, wherein causing the autonomous vehicle to implement the determined driving maneuver is performed responsive to receiving permission to implement the determined driving maneuver.

9. A system for operating an autonomous vehicle stopped at an intersection while located in a current travel lane, the current travel lane being a left turn lane, the autonomous vehicle operating in a highly automated mode such that the autonomous vehicle navigates or maneuvers without receiving input from a vehicle occupant, the autonomous vehicle having a travel path that includes making a left turn through the intersection, the system comprising:

a sensor system including one or more sensors configured to acquire data of an external environment of the autonomous vehicle; and a processor operatively connected to the sensor system, the processor being programmed to initiate executable operations comprising:

analyzing the acquired sensor data to detect whether an object is turning toward the autonomous vehicle from a direction that is transverse to a current travel direction of the autonomous vehicle;

responsive to detecting an object that is turning toward the autonomous vehicle from a direction that is transverse to the current travel direction of the autonomous vehicle, determining whether the detected object will impinge upon the autonomous vehicle by determining whether the detected object will pass through at least a portion of the current travel lane, whereby it is determined that the detected object will impinge upon the autonomous vehicle if the detected object will pass through at least a portion of the current travel lane;

responsive to determining that the detected object will impinge upon the autonomous vehicle, determining a driving maneuver for the autonomous vehicle to avoid being impinged upon by the detected object, the driving maneuver including moving the autonomous vehicle safely backward; and causing the autonomous vehicle to implement the determined driving maneuver.

10. The system of claim 9, wherein determining whether the detected object will impinge upon the autonomous vehicle further includes determining whether the detected object will pass within a predetermined distance from the autonomous vehicle.

11. The system of claim 9, wherein the driving maneuver further includes stopping short of an originally intended stopping point in a current travel lane of the autonomous vehicle.

12. The system of claim 9, wherein moving the autonomous vehicle safely backward includes moving the autonomous vehicle safely backward in substantially a longitudinal direction at least partially within a current travel lane of the autonomous vehicle.

13. The system of claim 9, wherein the driving maneuver further includes moving the autonomous vehicle substantially in a lateral direction away from the detected object.

14. The system of claim 9, wherein the driving maneuver further includes moving the autonomous vehicle at least partially into a travel lane that is adjacent to a current travel lane of the autonomous vehicle.

15. The system of claim 9, wherein at least a portion of the driving maneuver would safely violate a traffic rule.

16. The system of claim 9, wherein the executable operations further include:

prompting an occupant of the autonomous vehicle for permission to implement the determined driving maneuver, wherein causing the autonomous vehicle to implement the determined driving maneuver is performed responsive to receiving permission to implement the determined driving maneuver.

17. A computer program computer readable storage medium having program code embodied therein, the program code executable by a processor to perform a method of operating an autonomous vehicle stopped at an intersection while located in a current travel lane, the current travel lane being a left turn lane, the autonomous vehicle operating in a highly automated mode such that the autonomous vehicle navigates or maneuvers without receiving input from a vehicle occupant, the autonomous vehicle having a travel path that includes making a left turn through the intersection, the method comprising:

analyzing sensor data acquired by one or more sensors to detect whether an object is turning toward the autonomous vehicle from a direction that is transverse to a current travel direction of the autonomous vehicle;

responsive to detecting an object that is turning toward the autonomous vehicle from a direction that is transverse to the current travel direction of the autonomous vehicle, determining whether the detected object will impinge upon the autonomous vehicle by determining whether the detected object will pass through at least a portion of the current travel lane, whereby it is determined that the detected object will impinge upon the autonomous vehicle if the detected object will pass through at least a portion of the current travel lane;

responsive to determining that the detected object will impinge upon the autonomous vehicle, determining a driving maneuver for the autonomous vehicle to avoid being impinged upon by the detected object, the driving maneuver including moving the autonomous vehicle safely backward; and causing the autonomous vehicle to implement the determined driving maneuver.

* * * * *